(12) United States Patent
Tang

(10) Patent No.: US 11,012,373 B2
(45) Date of Patent: May 18, 2021

(54) METHOD, DEVICE AND SYSTEM FOR RESOURCE ALLOCATION

(71) Applicant: GUANGDONG OPPO MOBILE TELECOMMUNICATIONS CORP., LTD., Dongguan (CN)

(72) Inventor: Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/112,073

(22) Filed: Aug. 24, 2018

(65) Prior Publication Data

US 2018/0367471 A1 Dec. 20, 2018

Related U.S. Application Data

(63) Continuation of application No. PCT/CN2016/081312, filed on May 6, 2016.

(51) Int. Cl.
| | |
|---|---|
| *H04L 12/911* | (2013.01) |
| *H04W 16/10* | (2009.01) |
| *H04W 76/28* | (2018.01) |
| *H04W 76/36* | (2018.01) |
| *H04W 76/27* | (2018.01) |
| *H04W 36/00* | (2009.01) |

(Continued)

(52) U.S. Cl.
CPC ........... *H04L 47/823* (2013.01); *H04W 16/10* (2013.01); *H04W 36/0072* (2013.01); *H04W 72/048* (2013.01); *H04W 76/27* (2018.02); *H04W 76/28* (2018.02); *H04W 76/36* (2018.02); *H04W 28/26* (2013.01)

(58) Field of Classification Search
CPC .. G06Q 10/04; G06Q 10/06; G06Q 10/06315; G06Q 10/0631; G06F 9/505
See application file for complete search history.

(56) References Cited

U.S. PATENT DOCUMENTS

| | | | |
|---|---|---|---|
| 5,682,601 | A | 10/1997 | Sasuta |
| 6,792,273 | B1 | 9/2004 | Tellinger |

(Continued)

FOREIGN PATENT DOCUMENTS

| | | |
|---|---|---|
| CN | 1335037 A | 2/2002 |
| CN | 101277542 A | 10/2008 |

(Continued)

OTHER PUBLICATIONS

Supplementary European Search Report in the European application No. 16900880.2, dated Jan. 23, 2019.

(Continued)

*Primary Examiner* — Jung H Park
(74) *Attorney, Agent, or Firm* — Ladas & Parry, LLP

(57) ABSTRACT

Provided are a resource allocation method, device and system. The method includes: a network device allocating in advance, to the terminal device according to information associated with prediction of a service required by a terminal device, a network resource for subsequent service transfer. The resource allocation method, device and system provided in an embodiment of the invention enable a terminal to perform subsequent service transfer according to a network resource allocated in advance by a network device.

14 Claims, 5 Drawing Sheets

When a network device detects that a terminal device satisfies a preconfigured trigger event, send, to a behavior prediction apparatus, a prediction information query request carrying a terminal identifier  ~101 receive, by the network device, terminal service prediction information that is reported by the behavior prediction apparatus and is corresponding to the terminal identifier  ~102

(51) Int. Cl.
*H04W 72/04* (2009.01)
*H04W 28/26* (2009.01)

(56) References Cited

U.S. PATENT DOCUMENTS

| | | | |
|---|---|---|---|
| 2011/0021232 A1 | 1/2011 | Kazmi | |
| 2011/0143761 A1* | 6/2011 | Uusitalo | |
| 2013/0040683 A1* | 2/2013 | Siomina | H04W 28/0236 455/517 |
| 2014/0269251 A1* | 9/2014 | Zhou | H04W 24/04 370/216 |
| 2015/0289287 A1* | 10/2015 | Larsson | H04L 47/127 370/230 |
| 2017/0111916 A1* | 4/2017 | Corroy | H04W 72/0426 |
| 2019/0037420 A1* | 1/2019 | Fujishiro | H04W 24/02 |

FOREIGN PATENT DOCUMENTS

| | | |
|---|---|---|
| CN | 101998375 A | 3/2011 |
| CN | 104093209 A | 10/2014 |
| EP | 2928252 A1 | 10/2015 |
| JP | 2002534031 A | 10/2002 |
| JP | 2012209760 A | 10/2012 |
| JP | 2013172407 A | 9/2013 |
| WO | 2009116913 A1 | 9/2009 |
| WO | 2011070224 A1 | 6/2011 |
| WO | 2011124938 A1 | 10/2011 |
| WO | 2016003334 A1 | 1/2016 |

OTHER PUBLICATIONS

English Translation of the Written Opinion of the International Search Authority in the international application No. PCT/CN2016/081312, dated Jan. 3, 2017.
International Search Report in international application No. PCT/CN2016/081312, dated Jan. 3, 2017.
Written Opinion of the International Search Authority in international application No. PCT/CN2016/081312, dated Jan. 3, 2017.
First Office Action of the European application No. 16900880.2, dated Dec. 2, 2019.
First Office Action of the Japanese application No. 2018-551768, dated Jan. 7, 2020.
Second Office Action of the European application No. 16900880.2, dated Jul. 14, 2020.
First Office Action of the Indian application No. 201817044365, dated Jul. 27, 2020.
First Office Action of the Taiwanese application No. 106115044, dated Aug. 25, 2020.

* cited by examiner

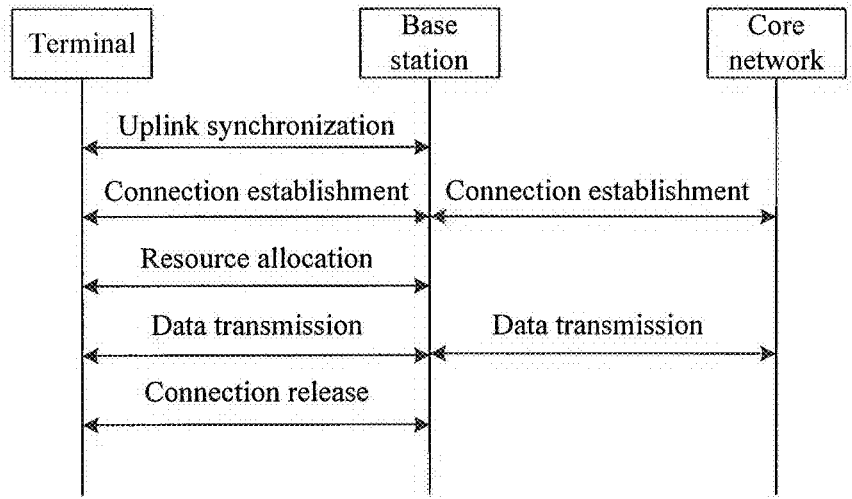

FIG. 1

```
When a network device detects that a terminal device satisfies a
preconfigured trigger event, send, to a behavior prediction apparatus,  ~ 101
a prediction information query request carrying a terminal identifier
```

```
receive, by the network device, terminal service prediction
information that is reported by the behavior prediction apparatus and  ~ 102
is corresponding to the terminal identifier
```

FIG. 2

```
generate, by a network device according to the terminal service
prediction information, a dedicated signaling carrying allocation  ~ 201
information of a network resource
```

```
send, by the network device, the signaling message carrying the
allocation information of the network resource to a corresponding
terminal device, such that the terminal device performs subsequent  ~ 202
service transfer according to the allocation information of the network
resource
```

FIG. 3

METHOD, DEVICE AND SYSTEM FOR RESOURCE ALLOCATION

CROSS-REFERENCE TO RELATED APPLICATION

This is a continuation application of International Patent Application No. PCT/CN2016/081312, filed on May 6, 2016, the content of which is incorporated by reference herein in its entirety for all purposes.

TECHNICAL FIELD

The present disclosure relates to the technical field of communications, and more particularly to a method, device and system for resource allocation.

BACKGROUND

In the existing communication network, all operations for a user are post-triggered. That is, when the user has a corresponding service, a network side will be triggered to correspondingly allocate network resources in an application manner, A main flow is specifically described with reference to FIG. 1 as follows.

FIG. 1 illustrates a schematic diagram of network resource allocation interaction in the related art. Referring to FIG. 1, when a user is in an idle state, if a corresponding service needs to be initiated, multiple flows such as connection establishment, network resource allocation and data transmission are required. Such mode has a large response delay and a poor response effect.

SUMMARY

A first objective of the disclosure is to provide a method for resource allocation. The method enables a network side terminal to allocate a network resource for subsequent service transfer to a terminal according to terminal service prediction information.

A second objective of the disclosure is to provide a method for resource allocation.

A third objective of the disclosure is to provide a method for resource allocation.

A fourth objective of the disclosure is to provide a network device.

A fifth objective of the disclosure is to provide a terminal device.

A sixth objective of the disclosure is to provide a behavior prediction apparatus.

A seventh objective of the disclosure is to provide a resource allocation system.

To achieve the foregoing objectives, an embodiment of a first aspect of the disclosure provides a method for resource allocation. The method includes the following action. A network device allocates a network resource for subsequent service transfer to a terminal device according to terminal service prediction information.

To achieve the foregoing objectives, an embodiment of a second aspect of the disclosure provides a method for resource allocation. The method includes the following actions. A terminal device acquires a network resource allocated by a network device, and performs a subsequent service according to the network resource.

To achieve the foregoing objectives, an embodiment of a third aspect of the disclosure provides a method for resource allocation. The method includes the following actions. A behavior prediction apparatus acquires terminal service prediction information, and sends the terminal service prediction information to a network device, such that the network device allocates, according to the terminal service prediction information, a network resource to a terminal device for performing a subsequent service.

To achieve the foregoing objectives, an embodiment of a fourth aspect of the disclosure provides a network device. The network device includes an allocation module configured to allocate a network resource for subsequent service transfer to a terminal device according to terminal service prediction information.

To achieve the foregoing objectives, an embodiment of a fifth aspect of the disclosure provides a terminal device. The terminal device includes: a first acquisition module, configured to acquire a network resource allocated by a network device; and a processing module, configured to perform subsequent service transfer according to the network resource.

To achieve the foregoing objectives, an embodiment of a sixth aspect of the disclosure provides a behavior prediction apparatus. The behavior prediction apparatus includes: a second acquisition module, configured to acquire terminal service prediction information and a sending module, configured to send the terminal service prediction information to a network device, such that the network device allocates a network resource for subsequent service transfer to a terminal device according to the terminal service prediction information.

To achieve the foregoing objectives, an embodiment of a seventh aspect of the disclosure provides a resource allocation system. The resource allocation system includes: at least one network device described as above, and at least one terminal device described as above.

BRIEF DESCRIPTION OF DRAWINGS

FIG. 1 illustrates a schematic diagram of network resource allocation interaction in the related art.

FIG. 2 illustrates a flowchart of a method for resource allocation according to an embodiment of the disclosure.

FIG. 3 illustrates a flowchart of a method for resource allocation according to another embodiment of the disclosure.

DETAILED DESCRIPTION

Figure 4:
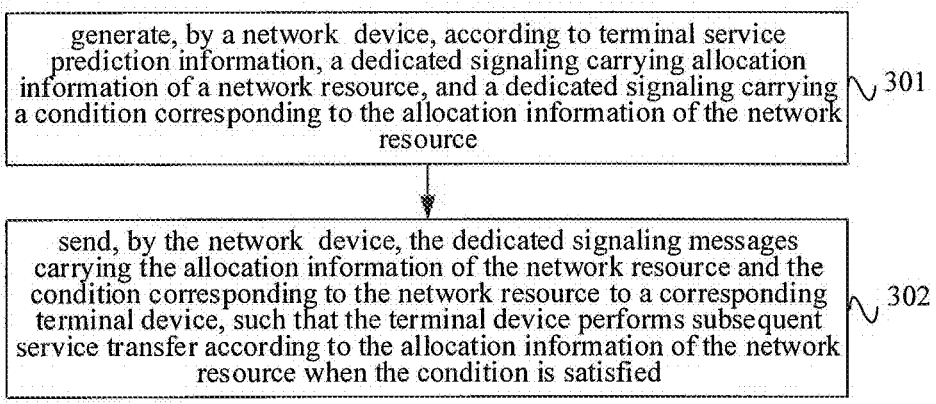
FIG. 4 illustrates a flowchart of a method for resource allocation according to another embodiment of the disclosure.

The embodiments of the disclosure are described in detail below, and the examples of the embodiments are illustrated in the accompanying drawings, wherein the same or similar reference numerals indicate the same or similar elements or elements having the same or similar functions. The embodiments described below with reference to the drawings are illustrative and intended to explain the disclosure, and cannot be construed as limiting the disclosure.

A method for resource allocation, device and system in the embodiments of the disclosure are described below with reference to the drawings.

For a current wireless communication network illustrated in FIG. 1, when a terminal device has a service trigger, a network device establishes a connection with the terminal device. Then the network device allocates a network resource for service transfer to the terminal device. To improve the service processing efficiency of the terminal device, the method for resource allocation provided by the disclosure includes the step as follows. The term "transfer" means transmission and/or reception.

A network device allocates a network resource for subsequent service transfer to a terminal device according to terminal service prediction information.

Specifically, the terminal device involved in the disclosure has many types, and includes, for example, an Internet-of-things terminal device, an in-vehicle terminal device, a smart phone terminal device, and the like, which is not limited in the present embodiment.

The network device allocates a network resource to the terminal device according to terminal service prediction information. Many contents of the terminal service prediction information include, for example, information deduced from a terminal user behavior or predetermined service information.

Therefore, the terminal device does not need to establish a connection with the network device for resource application when performing subsequent service transfer, but performs the subsequent service transfer according to the network resource allocated by the network device. For example, a next network access or a next data transmission is performed according to a resource allocated by the network device.

The method for resource allocation in the embodiment of the disclosure enables a network device to allocate a network resource for subsequent service transfer to a terminal device according to terminal service prediction information. Thus, a network resource for subsequent service transfer is allocated to a terminal through a predicted terminal service, thereby improving the processing efficiency and response speed of the terminal service.

Based on the foregoing embodiment, in order to further more fully allocate a network resource to the terminal device, the method for resource allocation provided by the disclosure includes the step as follows.

The network device allocates at least one of a network resource for subsequent service transfer or a condition for using the network resource to a terminal device according to terminal service prediction information.

Specifically, since different terminal devices correspond to different service trigger conditions. For example, an Internet-of-things terminal transmits data at 22:00 every night; or an in-vehicle terminal downloads data on a path from A to B at 8:00 every morning. Therefore, the network device allocates at least one of a network resource or a condition for using the network resource to the terminal device according to terminal service prediction information.

The condition for using the network resource includes at least one of a time condition, a position condition, or a user behavior, which may be selected according to actual application requirements, and will not limited in the present embodiment.

Further, when the terminal device satisfies the condition for using the network resource allocated, a subsequent service is processed according to the network resource allocated by the network side. Examples are taken as follows.

Example 1

The network device allocates a network resource and a condition for using the network resource to an Internet-of-things terminal.

If service prediction information of the Internet-of-things terminal is to transmit data at 22:00 every day, the network device allocates a network resource to the Internet-of-things terminal according to the service prediction information, and an allocated condition for using the network resource is 22:00.

Further, when the Internet-of-things terminal detects that the current time is 22:00, that is, when the condition for using the network resource is satisfied, data is sent according to the network resource allocated by the network device.

Example 2

The network device allocates a network resource and a condition for using the network resource to a mobile phone of a user.

If service prediction information of the mobile phone of the user is to watch a video at home at 20:00 every day, the network device allocates a network resource to the mobile phone of the user according to the service prediction information, and an allocated condition for using the network resource is 20:00 and/or the home location of the user.

Further, when the mobile phone of the user detects that the current time is 20:00 and the current location is home, that is, when the condition for using the network resource is satisfied, a video is watched according to the network resource allocated by the network device.

The method for resource allocation in the embodiment of the disclosure enables a network device to allocate a network resource for subsequent service transfer and a condition for using the network resource to a terminal device according to terminal service prediction information. Thus, a network resource for subsequent service transfer is allocated to a terminal through a predicted terminal service, thereby improving the processing efficiency and response speed of the terminal service, and more fully and reasonably utilizing the network resource.

Based on the foregoing embodiment, in order to further reasonably and effectively allocate a network resource to the terminal device, the method for resource allocation provided by the disclosure includes the step as follows.

The network device allocates at least one of a network resource for subsequent service transfer or a resource valid timer to a terminal device according to terminal service prediction information.

Specifically, the terminal device receives a network resource allocated by the network device, and a resource valid timer. Therefore, the subsequent service is processed during the effective period of the resource valid timer.

When the resource valid timer expires, the network device releases the allocated network resource for subsequent service transfer. Meanwhile, when the resource valid tinier expires, the terminal device subsequently performs network access and service transmission by using a normal access and data transmission flow.

The method for resource allocation in the embodiment of the disclosure enables a network device to allocate a network resource for subsequent service transfer and a resource valid timer to a terminal device according to terminal service prediction information. Thus, a network resource for subsequent service transfer is allocated to a terminal through a predicted terminal service, thereby improving the processing efficiency and response speed of the terminal service, and more fully and reasonably utilizing the network resource.

Based on the foregoing embodiment, the terminal service prediction information involved in the foregoing embodiment is sent to the network device by a behavior prediction apparatus.

The behavior prediction apparatus may be disposed on a network side according to actual application requirements, for example:

the behavior prediction apparatus may be independently disposed on the network side, and/or, the behavior prediction apparatus may be disposed in the network device.

Specifically, the behavior prediction apparatus predicts a service situation of the terminal device to acquire terminal service prediction information. The behavior prediction apparatus may acquire terminal service prediction information in different manners according to actual application requirements, for example:

the behavior prediction apparatus acquires terminal service prediction information according to allocation information of the terminal device; and/or, the behavior prediction apparatus acquires terminal service prediction information according to service feature information of the terminal device. The service feature information includes at least one of time feature information or place feature information.

The behavior prediction apparatus sends the terminal service prediction information to the network device, such that the network device allocates a network resource for subsequent service transfer to the terminal device according to the terminal service prediction information.

The behavior prediction apparatus may send the terminal service prediction information to the network device in many manners according to actual application requirements, such as a manner in which the behavior prediction apparatus actively issues the information to the network device, that is, the network device directly receives the terminal service prediction information reported from the behavior prediction apparatus and corresponding to a terminal identifier. Or, the manner is an acquisition mode in which the network device actively applies to the behavior prediction apparatus. The following is illustrated with the embodiment illustrated in FIG. 2.

FIG. 2 illustrates a flowchart of a method for resource allocation according to another embodiment of the disclosure.

Referring to FIG. 2, the implementation process in which the terminal service prediction information is sent to the network device by the behavior prediction apparatus is specifically as follows.

In step 101, when the network device detects that the terminal device satisfies a preconfigured trigger event, a prediction information query request carrying a terminal identifier is sent to the behavior prediction apparatus.

Specifically, the preconfigured trigger event may be set according to an application requirement, such as an active detect event of the network device to the terminal device, or a state event reported by the terminal device to the network device, for example, as follows:

the network device detects that the terminal device is switched from a first state to a second state, or, the network device receives a state change request message reported from the terminal device and indicating switching from a first state to a second state; or, the network device receives a change complete notification message reported from the terminal device and indicating switching from a first state to a second state.

It should be noted that, according to different application scenarios, contents corresponding to the first state and the second state are different, and the corresponding process of switching from the first state to the second state is different, for example, including:

switching from a connection state to an idle state; or, switching from a transmission state to an inactive state.

In step 102, the network device receives the terminal service prediction information that is reported by the behavior prediction apparatus and is corresponding to the terminal identifier.

Specifically, the behavior prediction apparatus parses the prediction information query request reported from the network device, and acquires the terminal identifier.

The behavior prediction apparatus queries terminal service prediction information stored and corresponding to the terminal identifier and sends the terminal service prediction information to the network device, Thus, the network device allocates a network resource for subsequent service transfer to the terminal device according to the terminal service prediction information, thereby improving the processing efficiency and the response speed.

According to the method for resource allocation in the embodiment of the disclosure, a network device applies, when learning that a terminal device satisfies a preconfigured trigger event, terminal service prediction information corresponding to the terminal device to a behavior prediction apparatus, and allocates a network resource for subsequent service transfer to the corresponding terminal device according to the terminal service prediction information. Thus, a corresponding predicted terminal service is acquired in real time according to the preconfigured trigger event satisfied by the terminal device, so that a network resource for subsequent service transfer is allocated to a terminal, thereby improving the processing efficiency and the response speed.

Based on the foregoing embodiment, the network device allocates a network resource for subsequent service transfer to the terminal device in many manners. The allocation via a signaling message is taken as an example, and the following is illustrated with the embodiment illustrated in FIG. 3 and FIG. 4.

FIG. 3 illustrates a flowchart of a method for resource allocation according to another embodiment of the disclosure.

Referring to FIG. 3, the step that the network device allocates a network resource for subsequent service transfer to the terminal device according to terminal service prediction information includes the following steps.

The network device sends allocation information of the network resource to the terminal device through a dedicated signaling, such that the terminal device processes a subsequent service according to the network resource. The following execution process may be specifically included.

In step 201, the network device generates, according to the terminal service prediction information, a signaling message carrying allocation information of the network resource.

In step 202, the network device sends the signaling message carrying the allocation information of the network resource to a corresponding terminal device, such that the terminal device processes a subsequent service according to the allocation information of the network resource.

FIG. 4 illustrates a flowchart of a method for resource allocation according to another embodiment of the disclosure.

Referring to FIG. 4, the step that the network device allocates a network resource for subsequent service transfer to the terminal device according to terminal service prediction information includes the following steps.

The network device sends allocation information of the network resource and a condition for using the network resource to the terminal device through a dedicated signaling, such that the terminal device processes a subsequent service according to the network resource when the condition is satisfied. The following execution process may be specifically included.

In step 301, the network device generates, according to the terminal service prediction information, a signaling message carrying allocation information of the network resource, and a signaling message carrying a condition for using the allocation information of the network resource.

In step 302, the network device sends the signaling messages carrying the allocation information of the network resource and the condition for using the network resource to a corresponding terminal device, such that the terminal device processes a subsequent service according to the allocation information of the network resource when the condition is satisfied.

Specifically, there are many types of signaling messages interacting between the network device and the terminal device in the embodiment illustrated in FIG. 3 and FIG. 4, and the signaling message may include, for example:

the signaling message is a state change permission message.

Specifically, when the network device receives a state change request message reported from the terminal device and indicating switching from a first state to a second state, the network device sends a state change permission message to the terminal device. The state change permission message includes a network resource allocated to the terminal device, or both of a network resource allocated to the terminal device and a condition for using the network resource.

Or the signaling message is a state confirmation message.

Specifically, when the network device receives a change complete notification message reported from the terminal device and indicating switching from a first state to a second state, the network device sends a state confirmation message to the terminal device. The state confirmation message includes a network resource allocated to the terminal device, or both of a network resource allocated to the terminal device and a condition for using the network resource.

As another example, the signaling message is a connection release message.

Specifically, when the network device determines that the network connection of the current terminal device is to be released, the network device sends a connection release message to the terminal device. The connection release message includes: a network resource allocated to the terminal device, or, a network resource allocated to the terminal device and a condition for using the network resource.

It should be noted that the foregoing is only an example, and may be applicable to other signaling messages indicating that the network device interacts with the terminal device according to application requirements.

The method for resource allocation in the embodiment of the disclosure enables a network device to allocate a network resource for subsequent service transfer to a terminal device through a signaling message according to terminal service prediction information. Thus, the distribution efficiency of a network resource is improved, processing resources are saved, and a network resource for subsequent service transfer is allocated to a terminal, thereby improving the processing efficiency and the response speed.

Based on the foregoing embodiment, service types corresponding to different terminal devices are different. Therefore, different terminal devices correspond to different terminal service prediction information. Thus, network resources allocated by the network device to the terminal device according to terminal service prediction information are also different.

As an example, the network device is an access network device.

The access network device allocates an access network resource or an access network resource and a condition for using the access network resource to a corresponding terminal device according to terminal service prediction information.

The access network resource includes at least one of an access network access network resource, an access network transmission network resource, an access network calculation network resource, or an access network storage network resource.

Further, when the terminal device is switched between multiple access network devices, at least one of the access network resource or a condition for using the access network resource may be coordinated between the access network device and other access network devices through a public entity or a public interface.

As an example, the network device is a core network device.

The core network device allocates a core network resource or a core network resource and a condition for using the core network resource to a corresponding terminal device according to terminal service prediction information.

The core network resource includes a core network transmission network resource, a core network calculation network resource and a core network storage network resource.

In order to more clearly illustrate the method for resource allocation provided by the disclosure, examples are taken as follows.

Specific Embodiment 1

1) After data transmission is completed, an MTC terminal is about to enter an inactive state, and the MTC terminal informs a network device or the network device actively knows that the terminal is about to enter the inactive state.

2) According to corresponding allocation information of the MTC terminal, for example, the MTC terminal will transmit data at xx every night, the network device allocates a network resource of the MTC terminal at a corresponding time point, such as a Physical Random Access Channel (PRACH) network resource or an uplink data transmission network resource (if the position of the MTC terminal does not change, TA does not change).

3) The network device issues the network resource to the MTC terminal through a state confirmation message or a connection release message, and simultaneously carries network resource effective time.

4) The MTC terminal detects that the current state meets the effective time of the network resource, and accesses or sends uplink data through the corresponding network resource allocated by the network side.

Specific Embodiment 2

1) After the end of a call, a user terminal is about to enter a suspended state or an idle state, and the user terminal informs a network device that the terminal is about to enter the suspended state or the idle state.

2) According to the statistical information of the user terminal, for example, a video program will be watched at home around 9:00 every night, the network device coordinates a network node to allocate a network resource at a corresponding time point of the user terminal.

3) The network device issues the network resource to the user terminal through a state confirmation message or a connection release message, and simultaneously carries network resource effective time and a corresponding network resource effective position (such as an access Cell ID).

4) The user terminal accesses a network and transmits and receives a service through a corresponding wireless access unit (Cell ID) at a corresponding time point.

Specific Embodiment 3

1) After the end of the previous transmission, a vehicle user terminal is about to enter an idle state or an inactive state, and the user terminal may inform a network device that the terminal is about to enter the idle state or the inactive state through a corresponding signaling.

2) According to the statistical information of the user terminal, for example, a certain position may be reached through a corresponding route at 7:00 next detecting, the network device coordinates multiple network nodes to allocate a network resource group at a corresponding time point.

3) The network device issues the network resource to the user terminal group through a state confirmation message or a connection release message, and simultaneously carries a set of time information and a corresponding set of cell ID information.

4) The user terminal accesses a network and transmits and receives a service through a corresponding wireless access unit at a corresponding time point.

Figure 5:
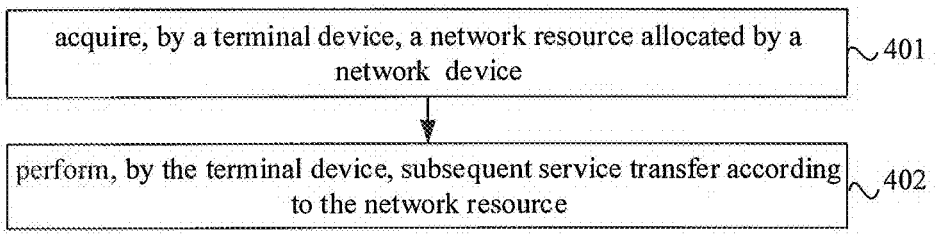
FIG. 5 illustrates a flowchart of a method for resource allocation according to another embodiment of the disclosure.

FIG. 5 illustrates a flowchart of a method for resource allocation according to another embodiment of the disclosure.

Referring to FIG. 5, the method for resource allocation provided in the present embodiment is applied to a terminal device. The method specifically includes the steps as follows.

In step 401, the terminal device acquires a network resource allocated by a network device.

In step 402, the terminal device processes a subsequent service according to the network resource.

Specifically, the network device allocates a network resource to the terminal device according to terminal service prediction information. It should be noted that the terminal device involved in the disclosure has many types, and includes, for example, an Internet-of-things terminal device, an in-vehicle terminal device, a smart phone terminal device, and the like, which is not limited in the present embodiment.

Therefore, the terminal device acquires a network resource allocated by the network device, and the terminal device does not need to establish a connection with the network device for resource application when performing subsequent service transfer, but performs the subsequent service transfer according to the network resource allocated by the network device. For example, a next network access or a next data transmission is performed according to a resource allocated by the network device.

The method for resource allocation in the embodiment of the disclosure enables a terminal device to acquire a network resource allocated by a network device, and to perform subsequent service transfer according to the network resource. Thus, a terminal is enabled to process the subsequent service transfer according to the network resource allocated by the network device, thereby improving the processing efficiency and response speed of a terminal service.

Figure 6:
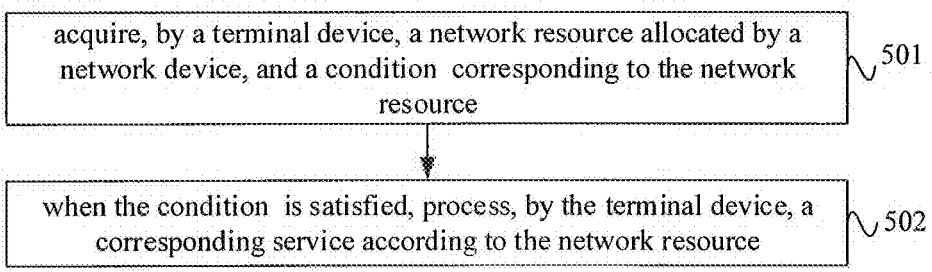
FIG. 6 illustrates a flowchart of a method for resource allocation according to another embodiment of the disclosure.

FIG. 6 illustrates a flowchart of a method for resource allocation according to another embodiment of the disclosure.

Referring to FIG. 6, the method for resource allocation provided in the present embodiment is applied to a terminal device. The method specifically includes the steps as follows.

In step 501, the terminal device acquires a network resource allocated by a network device, and a condition for using the network resource.

In step 502, when the condition is satisfied, the terminal device processes a corresponding service according to the network resource.

Specifically, since different terminal devices correspond to different service trigger conditions. For example, an Internet-of-things terminal transmits data at 22:00 every night; or an in-vehicle terminal downloads data on a path from A to B at 8:00 every morning, Therefore, the network device allocates a network resource and a condition for using the network resource to the terminal device according to terminal service prediction information.

The condition for using the network resource includes at least one of a time condition, a position condition or a user behavior, which may be selected according to actual application requirements, and will not limited in the present embodiment.

Further, when the terminal device satisfies the condition for using the network resource allocated, a subsequent service is processed according to the network resource allocated by the network side.

The method for resource allocation in the embodiment of the disclosure enables a terminal device to acquire a network resource allocated by a network device and a condition for using the network resource, and when the condition is satisfied, the terminal device processes a corresponding service according to the network resource. Thus, a terminal is enabled to perform subsequent service transfer according to the network resource allocated by the network side and the condition, thereby improving the processing efficiency and response speed of a terminal service, and more fully and reasonably utilizing the network resource.

Based on the foregoing embodiment, the network device allocates a network resource for subsequent service transfer to the terminal device in many manners. The issuing of a network resource to the terminal device in a signaling message manner is taken as an example as follows.

The terminal device receives a signaling message reported from the network device and including the network resource.

The terminal device parses the signaling message to acquire the network resource.

The signaling message includes:

a state confirmation message; or, a state change permission message; or, a connection release message.

The method for resource allocation in the embodiment of the disclosure enables a network device to allocate a network resource for subsequent service transfer to a terminal device through a signaling message according to terminal service prediction information. Thus, the distribution efficiency of a network resource is improved, processing resources are saved, and a network resource for subsequent service transfer is allocated to a terminal, thereby improving the processing efficiency and the response speed.

Figure 7:
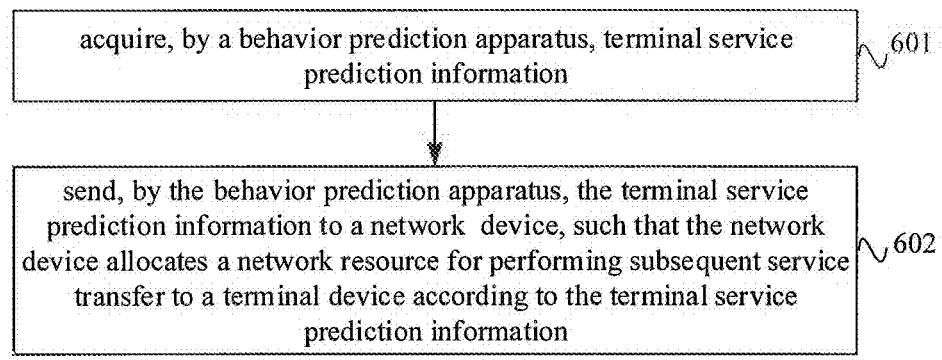
FIG. 7 illustrates a flowchart of a method for resource allocation according to another embodiment of the disclosure.

FIG. 7 illustrates a flowchart of a method for resource allocation according to another embodiment of the disclosure.

Referring to FIG. 7, the method for resource allocation provided in the present embodiment is applied to a behavior prediction apparatus. The method specifically includes the steps as follows.

In step 601, the behavior prediction apparatus acquires terminal service prediction information.

In step 602, the behavior prediction apparatus sends the terminal service prediction information to a network device, such that the network device allocates a network resource for subsequent service transfer to a terminal device according to the terminal service prediction information.

Specifically, the behavior prediction apparatus may be disposed on a network side according to actual application requirements, for example;

the behavior prediction apparatus may be independently disposed on the network side, and/or, the behavior prediction apparatus may be disposed in the network device.

Specifically, the behavior prediction apparatus predicts a service situation of the terminal device to acquire terminal service prediction information. The behavior prediction apparatus may acquire terminal service prediction information in different manners according to actual application requirements, for example:

the behavior prediction apparatus acquires terminal service prediction information according to allocation information of the terminal device; and/or, the behavior prediction apparatus acquires terminal service prediction information according to service feature information of the terminal device. The service feature information includes at least one of time feature information or place feature information.

The behavior prediction apparatus sends the terminal service prediction information to the network device, such that the network device allocates a network resource for subsequent service transfer to the terminal device according to the terminal service prediction information.

The method for resource allocation in the embodiment of the disclosure enables a behavior prediction apparatus to issue terminal service prediction information to a network device, and the network device allocates a network resource for subsequent service transfer to a terminal device according to the terminal service prediction information. Thus, a network resource for subsequent service transfer is allocated to a terminal through a predicted terminal service, thereby improving the processing efficiency and the response speed.

In order to implement the foregoing embodiment, the disclosure also provides a network device.

Figure 8:
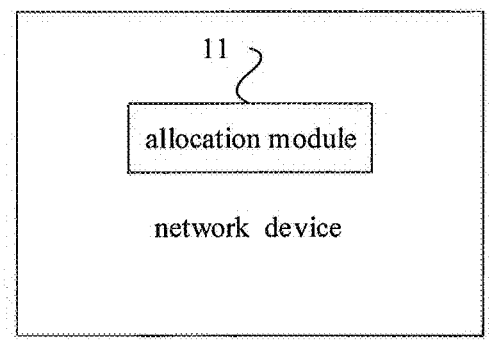
FIG. 8 illustrates a structure block diagram of a network device according to an embodiment of the disclosure.

FIG. 8 illustrates a structure block diagram of a network device according to an embodiment of the disclosure.

As illustrated in FIG. 8, the network device includes an allocation module 11.

The allocation module 11 is configured to allocate a network resource for subsequent service transfer to a terminal device according to terminal service prediction information.

Many contents of the terminal service prediction information include, for example, information deduced from a terminal user behavior or predetermined service information.

It should be noted that the foregoing description of the embodiment of the method for resource allocation is also applicable to the network device in the present embodiment, and the implementation principle and the technical effect are similar, which will not be elaborated.

Further, based on the foregoing embodiment, the allocation module 11 is configured to: allocate at least one of a network resource for subsequent service transfer or a condition for using the network resource to a terminal device according to terminal service prediction information.

The condition includes at least one of a time condition, a position condition or a user behavior.

It should be noted that the foregoing description of the embodiment of the method for resource allocation is also applicable to the network device in the present embodiment, and the implementation principle and the technical effect are similar, which will not be elaborated.

Further, based on the foregoing embodiment, the allocation module 11 is configured to: allocate at least one of a network resource for subsequent service transfer or a resource valid timer to a terminal device according to terminal service prediction information.

When the resource valid timer expires, the network device releases the allocated network resource for subsequent service transfer.

When the resource valid timer expires, the terminal device subsequently performs network access and service transmission by using a normal access and data transmission flow.

It should be noted that the foregoing description of the embodiment of the method for resource allocation is also applicable to the network device in the present embodiment, and the implementation principle and the technical effect are similar, which will not be elaborated.

Based on the foregoing embodiment, further, the terminal service prediction information is sent to the network device by a behavior prediction apparatus.

The behavior prediction apparatus may send the terminal service prediction information to the network device in many manners according to actual application requirements, such as a manner in which the behavior prediction apparatus actively issues the information to the network device, that is, the network device directly receives the terminal service prediction information reported from the behavior prediction apparatus and corresponding to a terminal identifier. Or, the manner is an acquisition mode in which the network device actively applies to the behavior prediction apparatus. The following is illustrated with the embodiment illustrated in FIG. 9.

Figure 9:
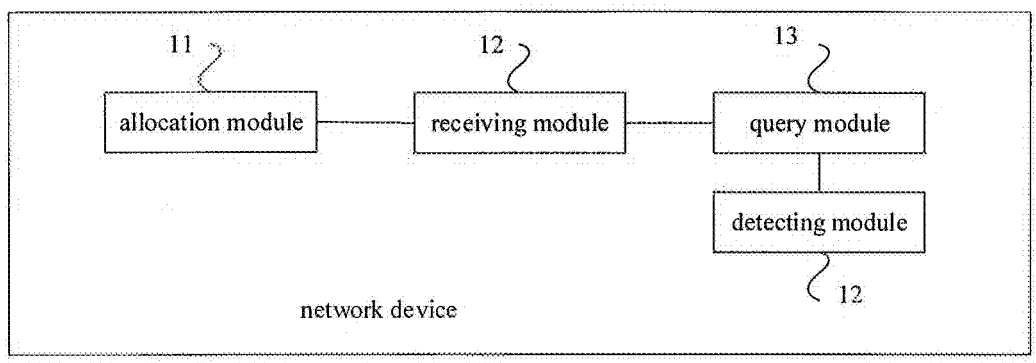
FIG. 9 illustrates a structure block diagram of a network device according to another embodiment of the disclosure.

FIG. 9 illustrates a structure block diagram of a network device according to another embodiment of the disclosure.

As illustrated in FIG. 9, based on FIG. 8, the network device further includes a detecting module 12, a query module 13 and a receiving module 14.

The detecting module 12 is configured to detect that the terminal device satisfies a preconfigured trigger event;

The query module 13 is configured to send a prediction information query request carrying a terminal identifier to the behavior prediction apparatus; and The receiving module 14 is configured to receive terminal service prediction information that is reported by the behavior prediction apparatus and is corresponding to the terminal identifier.

Specifically, the detecting module 12 is configured to:

receive a state change request message that is reported from the terminal device and indicates switching from a first state to a second state; or, receive a change complete notification message that is reported from the terminal device and indicates switching from the first state to the second state; or, detect that the terminal device is switched from the first state to the second state.

Switching from a first state to a second state includes:

switching from a connection state to an idle state; or, switching from a transmission state to an inactive state.

Based on the foregoing example, further, the allocation module 11 is configured to: send, by the network device, allocation information of the network resource to the terminal device through a dedicated signaling, such that the terminal device processes a subsequent service according to the network resource.

Based on the foregoing example, further, the allocation module 11 is configured to: send, by the network device, allocation information of the network resource and a condition for using the network resource to the terminal device through a dedicated signaling, such that the terminal device processes a subsequent service according to the network resource when the condition is satisfied.

The signaling message includes:

a state confirmation message; or, a state change permission message; or, a connection release message.

It should be noted that the foregoing description of the embodiment of the method for resource allocation is also applicable to the network device in the present embodiment, and the implementation principle and the technical effect are similar, which will not be elaborated.

Based on the foregoing embodiment, service types corresponding to different terminal devices are different. Therefore, different terminal devices correspond to different terminal service prediction information. Thus, network resources allocated by the network device to the terminal device according to terminal service prediction information are also different.

As an example, the network device is an access network device.

The allocation module 11 is configured to: allocate an access network resource for subsequent service transfer to a terminal device.

The access network resource includes at least one of an access network access network resource, an access network transmission network resource, an access network calculation network resource, or an access network storage network resource.

Further, the allocation module 11 is configured to allocate an access network resource for subsequent service transfer and a condition for using the access network resource to a terminal device.

Figure 10:
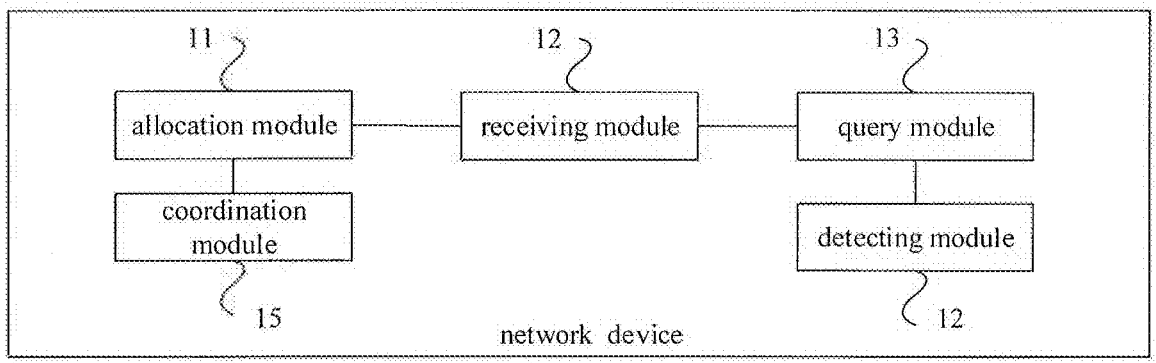
FIG. 10 illustrates a structure block diagram of a network device according to another embodiment of the disclosure.

Further, FIG. 10 illustrates a structure block diagram of a network device according to another embodiment of the disclosure.

As illustrated in FIG. 10, based on FIG. 9, the network device further includes a coordination module 15.

The coordination module 15 is configured to coordinate at least one of the access network resource or a condition for using the access network resource with other access network devices through a public entity or a public interface.

As an example, the network device is a core network device.

The allocation module 11 is configured to allocate a core network resource for subsequent service transfer to a terminal device.

The core network resource includes at least one of a core network transmission network resource, a core network calculation network resource, or a core network storage network resource.

Further, the allocation module 11 is configured to allocate a core network resource for subsequent service transfer and a condition for using the core network resource to a terminal device.

It should be noted that the foregoing description of the embodiment of the method for resource allocation is also applicable to the network device in the present embodiment, and the implementation principle and the technical effect are similar, which will not be elaborated.

In order to implement the foregoing embodiment, the disclosure also provides a terminal device.

Figure 11:
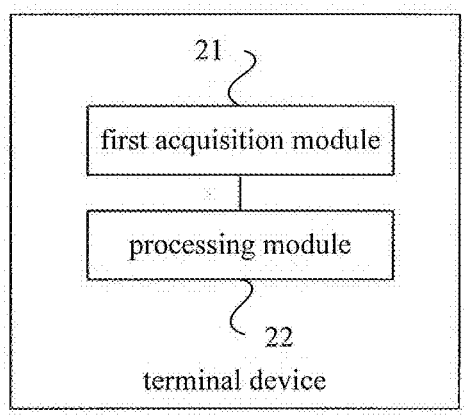
FIG. 11 illustrates a structure block diagram of a terminal device according to an embodiment of the disclosure.

FIG. 11 illustrates a structure block diagram of a terminal device according to an embodiment of the disclosure.

As illustrated in FIG. 11, the terminal device includes a first acquisition module 21 and a processing module 22.

The first acquisition module 21 is configured to acquire a network resource allocated by a network device.

The processing module 22 is configured to perform subsequent service transfer according to the network resource.

It should be noted that the foregoing description of the embodiment of the method for resource allocation is also applicable to the terminal device in the present embodiment, and the implementation principle and the technical effect are similar, which will not be elaborated.

Further, the first acquisition module 21 is configured to acquire a network resource allocated by a network device, and a condition for using the network resource.

The processing module 22 is configured to enable, when the condition is satisfied, the terminal device to process a corresponding service according to the network resource.

The condition includes at least one of a time condition, a position condition, or a user behavior.

It should be noted that the foregoing description of the embodiment of the method for resource allocation is also applicable to the terminal device in the present embodiment, and the implementation principle and the technical effect are similar, which will not be elaborated.

Further, the first acquisition module 21 is configured to receive a signaling message reported from the network device, the signaling message including: a network resource allocated, or, the network resource and a condition for using the network resource.

The processing module 22 is configured to parse the signaling message to acquire the network resource or the network resource and the condition for using the network resource.

The signaling message includes:
a state confirmation message; or,
a state change permission message; or,
a connection release message.

It should be noted that the foregoing description of the embodiment of the method for resource allocation is also applicable to the terminal device in the present embodiment, and the implementation principle and the technical effect are similar, which will not be elaborated.

In order to implement the foregoing embodiment, the disclosure also provides a behavior prediction apparatus.

Figure 12:
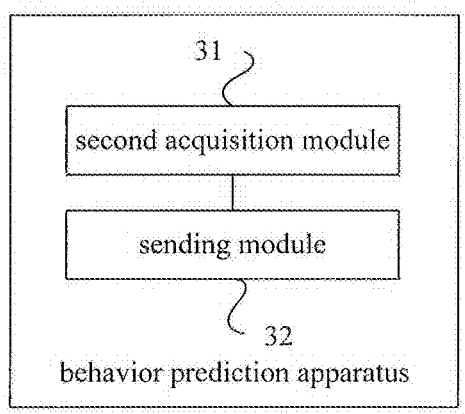
FIG. 12 illustrates a structure block diagram of a behavior prediction apparatus according to an embodiment of the disclosure.

FIG. 12 illustrates a structure block diagram of a behavior prediction apparatus according to an embodiment of the disclosure.

As illustrated in FIG. 12, the behavior prediction apparatus includes a second acquisition module 31 and a sending module 32.

The second acquisition module 31 is configured to acquire terminal service prediction information.

The sending module 32 is configured to send the terminal service prediction information to a network device, such that the network device allocates a network resource for subsequent service transfer to a terminal device according to the terminal service prediction information.

Specifically, the second acquisition module 31 is configured to perform at least one of following steps:
acquiring terminal service prediction information according to allocation information of the terminal device; or,
collecting service feature information of the terminal device to acquire terminal service prediction information.

The service feature information includes at least one of time feature information, or place feature information.

It should be noted that the foregoing description of the embodiment of the method for resource allocation is also applicable to the behavior prediction apparatus in the present embodiment, and the implementation principle and the technical effect are similar, which will not be elaborated.

In order to implement the foregoing embodiment, the disclosure also provides a resource allocation system.

Figure 13:
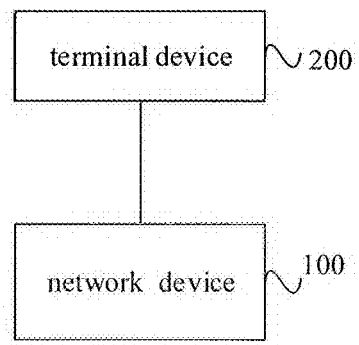
FIG. 13 illustrates a structure block diagram of a resource allocation system according to an embodiment of the disclosure.

FIG. 13 illustrates a structure block diagram of a resource allocation system according to an embodiment of the disclosure.

As illustrated in FIG. 13, the resource allocation system includes: at least one network device 100 and at least one terminal device 200.

The network device 100 includes at least one of an access network device 300, or a core network device 400.

It should be noted that the foregoing description of the embodiment of the method for resource allocation is also applicable to the resource allocation system in the present embodiment, and the implementation principle and the technical effect are similar, which will not be elaborated.

Figure 14:
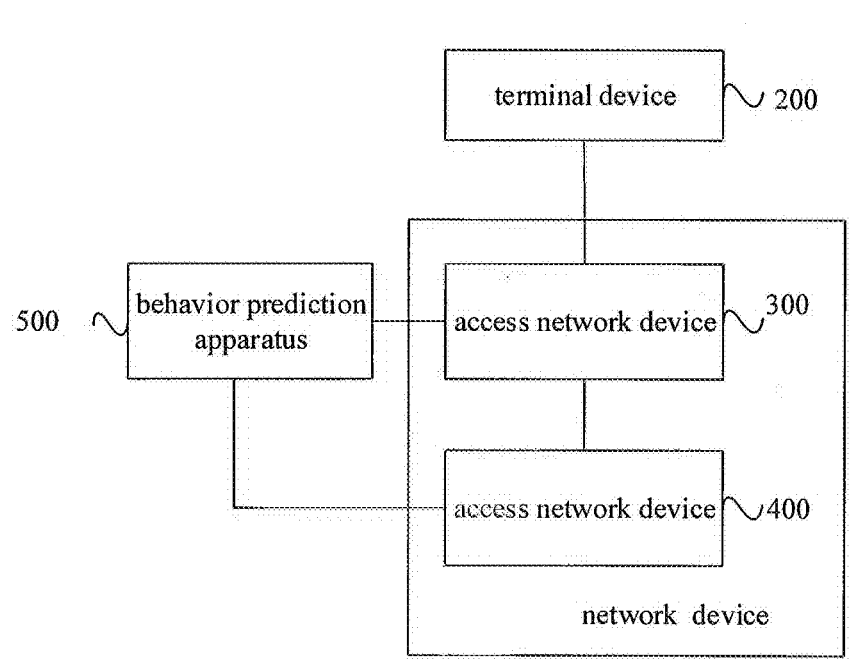
FIG. 14 illustrates a structure block diagram of a resource allocation system according to another embodiment of the disclosure.

FIG. 14 illustrates a structure block diagram of a resource allocation system according to another embodiment of the disclosure.

As illustrated in FIG. 14, based on the embodiment illustrated in FIG. 13, the system further includes: a behavior prediction apparatus 500, wherein the network device 100 in the present example includes: an access network device 300 and a core network device 400.

As an example, the behavior prediction apparatus 500 is disposed in the network device 100 (not illustrated), and/or, the behavior prediction apparatus 500 is independently disposed on the network side (as illustrated in FIG. 14).

It should be noted that the foregoing description of the embodiment of the method for resource allocation is also applicable to the resource allocation system in the present embodiment, and the implementation principle and the technical effect are similar, which will not be elaborated.

In the description of the present specification, the description with reference to the terms "one embodiment", "some embodiments", "example", "specific example", or "some examples" and the like means that a specific feature, structure, material or characteristic described in connection with the embodiment or example is included in at least one embodiment or example of the disclosure. In the present specification, the schematic representation of the above terms is not necessarily directed to the same embodiment or example. Furthermore, the described specific feature, structure, material or characteristic may be combined in a suitable manner in any one or more embodiments or examples. In addition, various embodiments or examples described in the present specification, as well as features of various embodiments or examples, may be combined by those skilled in the art.

Moreover, the terms "first" and "second" are used for descriptive purposes only and are not to be construed as indicating or implying a relative importance or implicitly indicating the number of technical features indicated. Thus, features defining "first" or "second" may include at least one of the features, either explicitly or implicitly. In the description of the disclosure, the meaning of "multiple" is at least two, such as two, three, etc., unless specifically defined otherwise.

The invention claimed is:

1. A method for resource allocation, comprising:
when a network device detects that a terminal device satisfies a preconfigured trigger event, sending, by the network device to a behavior prediction apparatus, a prediction information query request carrying a terminal identifier;
receiving, by the network device, terminal service prediction information that is reported by the behavior prediction apparatus and is corresponding to the terminal identifier; and
allocating, by the network device to the terminal device according to the terminal service prediction information, a network resource for subsequent service transfer,
wherein detecting, by the network device, that the terminal device satisfies the preconfigured trigger event comprises:
receiving, by the network device, a state change request message that is reported from the terminal device and indicates switching from a first state to a second state; or,
receiving, by the network device, a change complete notification message that is reported from the terminal device and indicates switching from the first state to the second state; or
detecting, by the network device, that the terminal device is switched from the first state to the second state.

2. The method according to claim 1, wherein allocating, by the network device to the terminal device according to the terminal service prediction information, the network resource for subsequent service transfer comprises:
allocating, by the network device to the terminal device according to the terminal service prediction information, at least one of the network resource for subsequent service transfer or a condition for using the network resource.

3. The method according to claim 1, wherein allocating, by the network device to the terminal device according to the terminal service prediction information, the network resource for subsequent service transfer comprises:
    allocating, by the network device to the terminal device according to the terminal service prediction information, at least one of the network resource for subsequent service transfer or a resource valid timer.

4. The method according to claim 3, comprising:
    when the resource valid timer expires, releasing, by the network device, the allocated network resource for subsequent service transfer;
    wherein when the resource valid timer expires, the terminal device subsequently performs network access and service transmission by using a normal access and data transmission flow.

5. The method according to claim 1, wherein
    the terminal service prediction information comprises: information deduced from a terminal user behavior, or predetermined service information.

6. The method according to claim 1, wherein switching from the first state to the second state comprises:
    switching from a connection state to an idle state; or,
    switching from a transmission state to an inactive state.

7. The method according to claim 1, wherein allocating, to the terminal device, the network resource for subsequent service transfer comprises:
    sending, by the network device, allocation information of the network resource to the terminal device through a dedicated signaling, such that the terminal device performs the subsequent service transfer according to the network resource.

8. The method according to claim 7, wherein sending, by the network device, the allocation information of the network resource to the terminal device through the dedicated signaling comprises:
    sending, by the network device, the allocation information of the network resource and a condition for using the network resource to the terminal device through the dedicated signaling, such that the terminal device performs the subsequent service transfer according to the network resource when the condition is satisfied.

9. The method according to claim 7, wherein the signaling message comprises:
    a state confirmation message; or
    a state change permission message; or,
    a connection release message.

10. The method according to claim 1, wherein the network device is an access network device; and allocating, to the terminal device, the network resource for subsequent service transfer comprises:
    allocating, by the access network device to the terminal device, an access network resource for subsequent service transfer, the access network resource comprising at least one of an access network access network resource, an access network transmission network resource, an access network calculation network resource, or an access network storage network resource.

11. The method according to claim 10, wherein allocating, by the access network device to the terminal device, the access network resource for subsequent service transfer comprises:
    allocating, by the access network device, the access network resource for subsequent service transfer and a condition for using the access network resource to the terminal device.

12. The method according to claim 10, further comprising:
    coordinating, through a public entity or a public interface between the access network device and other access network devices, at least one of the access network resource, or a condition for using the access network resource.

13. The method according to claim 1, wherein the network device is a core network device; and allocating the network resource for subsequent service transfer to a terminal device comprises:
    allocating, by the core network device to the terminal device, a core network resource for subsequent service transfer, wherein the core network resource comprises at least one of a core network transmission network resource, a core network calculation network resource, or a core network storage network resource.

14. The method according to claim 13, wherein allocating, by the core network device to the terminal device, the core network resource for subsequent service transfer comprises:
    allocating, by the core network device to the terminal device, the core network resource for subsequent service transfer and a condition for using the core network resource.

* * * * *